United States Patent Office 3,630,895
Patented Dec. 28, 1971

3,630,895
TEXTILE SOFTENING AND OPTICAL
BRIGHTENING COMPOSITIONS
Horst-Jurgen Krause and Manfred Dohr, Dusseldorf-Holthausen, and Helmut Bloching, Hilden, Germany, assignors to Henkel & Cie GmbH, Dusseldorf-Holthausen, Germany
No Drawing. Filed June 26, 1969, Ser. No. 836,958
Claims priority, application Germany, July 2, 1968,
P 17 69 718.6
Int. Cl. C09k 1/02; D06m 13/34
U.S. Cl. 252—8.75                                  8 Claims

ABSTRACT OF THE DISCLOSURE

Textile softening and optical brightening compositions comprising a content of a water-dispersible salt of a surface-active ammonium compound and a content of a water-dispersible cationic optical brightener having the formula:

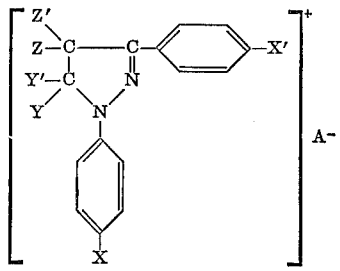

wherein:

X is a member selected from the group consisting of —SO$_2$NH$_2$, —SO$_2$R, —SO$_2$—OR, —COOR, —CONH$_2$, —CN, —CF$_3$, halogen, —OR, and R;
X' is a member selected from the group consisting of halogen, —OR and —R;
Y is a member selected from the group consisting of:

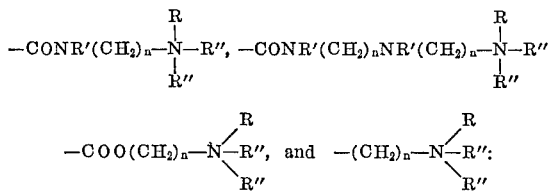

Y' is a member selected from the group consisting of H, —R and phenyl;
Z is a member selected from the group consisting of H and Y;
Z' is a member selected from the group consisting of H and R;
R is alkyl having 1 to 4 carbon atoms;
R' is a member selected from the group consisting of H and R;
R'' is a member selected from the group consisting of R and —(CH$_2$)$_{n-1}$—CH$_2$OH;
n is an integer from 2 to 4; and
A$^-$ is an anion of an acid.

THE PRIOR ART

It is known that, in the case of numerous optical brighteners, cationic surface-active substances wholly or partly extinguish the fluorescence of the brighteners. This drawback is shown especially when washed with optically brightened laundry is subsequently treated with a cationic softening agent or when an optical brightener is incorporated in a cationic softening agent. Combinations of cationic surface-active substances and certain optical brighteners of the diaminostilbenedisulfonic acid type are indeed known which show a certain brightening action towards textiles made of cellulose fibers, for example cotton. Textiles made of chemically modified cellulose, such as artificial silk, staple fiber, finished or dressed cotton and also completely synthetic fibers and silk, however, are not brightened by these agents.

OBJECTS OF THE INVENTION

An object of the present invention is the obtention of a textile softening and optical brightening composition comprising a content of a water-dispersible salt of a surface-active ammonium compound and a content of a water-dispersible cationic optical brightener having the formula:

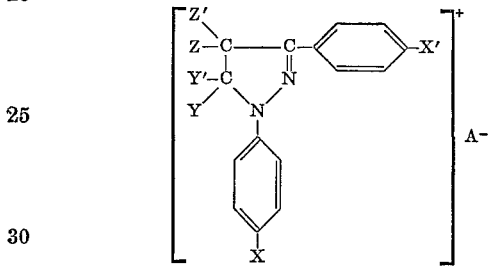

wherein:

X is a member selected from the group consisting of —SO$_2$NH$_2$, —SO$_2$R, —SO$_2$OR, —COOR, —CONH$_2$, —CN, —CF$_3$, halogen, —OR, and R;
X' is a member selected from the group consisting of halogen, —OR and —R;
Y is a member selected from the group consisting of:

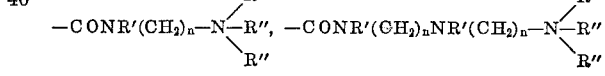

Y' is a member selected from the group consisting of H, —R and phenyl;
Z is a member selected from the group consisting of H and Y;
Z' is a member selected from the group consisting of H and R;
R is alkyl having 1 to 4 carbon atoms;
R' is a member selected from the group consisting of H and R;
R'' is a member selected from the group consisting of R and —(CH$_2$)$_{n-1}$—CH$_2$OH;
n is an integer from 2 to 4; and
A$^-$ is an anion of an acid.

These and other objects of the invention will become more apparent as the description thereof proceeds.

DESCRIPTION OF THE INVENTION

The present invention therefore provides a softening and optical brightening composition for textiles comprising a salt of a surface-active ammonium compound and a cationic optical brightener of the Formula I.

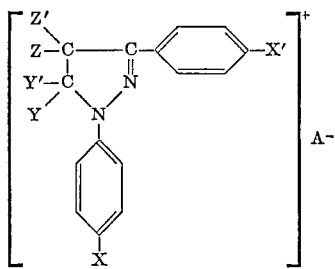

wherein
X represents —$SO_2NH_2$, —$SO_2R$, —$SO_2$—$OR$, —$COOR$, —$CONH_2$, —$CN$, —$CF_3$, halogen, OR or R;
X' represents halogen, OR or R;
Y represents

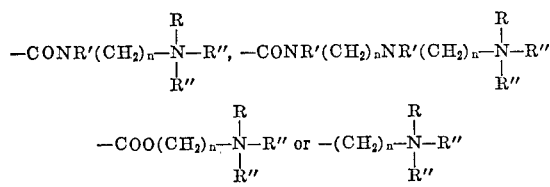

Y' represents H, R or an unsubstituted phenyl;
Z represents H or Y;
Z' represents H or R;
R represents an alkyl having 1 to 4 carbon atoms;
R' represents H or R;
R'' represents R or —$(CH_2)_{n-1}$—$CH_2OH$:
$n$ is an integer of 2, 3 or 4;
$A^-$ is an anion of an acid.

Preferred optical brighteners are those of Formula I above, and especially those of Formula II below:

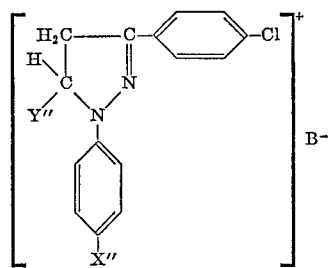

wherein
X'' represents —$SO_2NH_2$, —$COOR'''$ or —$CONH_2$;
Y'' represents

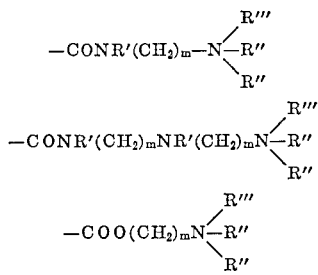

R''' represents an alkyl having 1 to 3 carbon atoms,
R' represents H or R''',
R'' represents R''' or —$(CH_2)_{m-1}$—$CH_2OH$,
$m$ is an integer of 2 or 3,
$B^-$ is a halide, acetate or alkylsulfate ion or the equivalent of a polyvalent acid, for example, sulfuric, phosphoric, oxalic and citric acids.

The 1,3-$\Delta^2$-diarylpyrazolines substituted in the 4 and/or 5 positions with quaternary ammonium groups of Formulas I and II are described in the copending, commonly-assigned United States patent application Ser. No. 836,- 959, filed on even date herewith and entitled "Textile Optical Brighteners." Examples of such optical brighteners are 1-p-sulfamylphenyl - 3 - p - chlorophenyl - $\Delta^2$ - pyrazoline-carboxylic acid - (5) - N - trimethylammonium-propylamide methosulfate,
1-p-sulfamylphenyl - 3 - p - chlorophenyl - $\Delta^2$ - pyrazoline-carboxylic acid-(5)-N-trimethylammonium-ethylamide chloride,
1-p-sulfamylphenyl - 3 - p - chlorophenyl - $\Delta^2$ - pyrazoline-carboxylic acid-(5)-N-trimethylammonium-N'-methyl-ethylenediamine-amide acetate,
1-p-sulfamylphenyl - 3 - p - chlorophenyl - $\Delta^2$ - pyrazoline-5-carbethoxyamine-N-methyl - diethanol - ammonium methosulfate,
1-p-carbethoxyphenyl-3-p-methylphenyl - $\Delta^2$ - pyrazoline-carboxylic acid-(5) - N - trimethylammonium - propylamide methophosphate,
1-p-carbamylphenyl-3-p - ethoxyphenyl - $\Delta^2$ - pyrazoline-carboxylic acid-(5) - N - trimethylammonium - propylamide metheoxylate, etc.

Compounds of the following structure are examples of suitable salts of surface-active ammonium compounds:

(1)
$$\left[ \begin{array}{c} R_2 \\ R_1-N-R_3 \\ R_4 \end{array} \right]^+ A^-$$

(2)
$$\left[ \begin{array}{c} R_3 \\ R_1-CO-N-R_6-N-R_4 \\ R_5 \quad\quad R_5 \end{array} \right]^+ A^-$$

(3)
$$\left[ R_1-CO-N-R_6-\text{(phenyl)} \atop R_5 \right]^+ A^-$$

(4)
$$\left[ \begin{array}{c} N-CH_2 \\ R_1-C \\ N-CH_2 \\ R_3 \quad R_5 \end{array} \right]^+ A^-$$

(5)
$$\left[ \begin{array}{c} N-CH_2 \\ R_1-C \\ N-CH_2 \\ R_5 \quad R_6-NH-CO-R_2 \end{array} \right]^+ A^-$$

(6)
$$\left[ \begin{array}{c} R_3 \\ R_1-CO-N-R_6-N-R_6-O-CO-R_2 \\ R_5 \quad\quad R_5 \end{array} \right]^+ A^-$$

wherein
$R_1$ and $R_2$ represent the same or different, saturated or unsaturated, aliphatic hydrocarbon residues with 11 to 25, preferably 15 to 21 carbon atoms,
$R_3$ represents an alkyl or hydroxyalkyl group with 1 to 3 carbon atoms,
$R_4$ represents $R_3$ or a benzyl group,
$R_5$ represents $R_3$ or a hydrogen atom,
$R_6$ represents an alkylene group with 1 to 3 carbon atoms,
$A^-$ represents an anion of a water-solubilizing acid, for example a halide, acetate, or alkylsulfate ion or an equivalent of a sulfate or lower alkyl phosphate ion or the anion of a polyvalent carboxylic acid, for example oxalic or citric acid.

Mixtures of different surface-active ammonium compounds may also be used. The agents according to the invention preferably contain quaternary ammonium salts according to Formula I above, in which the residues $R_1$ and $R_2$ represent straight-chain, saturated hydrocarbon residues with 16 to 18 carbon atoms and the residues $R_3$ and $R_4$ represent methyl or ethyl groups.

Representative of the surface-active ammonium compounds of the first formula are: di-$C_{16}$–$C_{18}$-alkyl-dimethyl-ammonium chloride, di - $C_{16}$–$C_{18}$-alkyl-diethanol-ammonium bromide, di-$C_{16}$–$C_{18}$-alkyl-methyl-benzyl-ammonium methosulfate, etc.

Representative of the second formula are: N-oleyl-N-methyl ethylenediamine-N'-trimethyl-ammonium chloride, N-lauroyl-propylenediamine-N'-methyl-N'-diethanol-ammonium methophosphate, etc.

Representative of the third formula are: N'-lauroyl-N-ethylamine-pyridinium acetate, N'-oleyl-N-propylamine-pyridinium chloride, etc.

Representative of the fourth formula are: 2-$C_{16}$–$C_{18}$-alkyl-3-dimethyl-glyoxalidinium chloride, 2-lauryl - 3 - dimethyl-glyoxalidinium methosulfate, etc.

Representative of the fifth formula are: 2-$C_{16}$–$C_{18}$-alkyl-3-methyl - 3 - ethylamine-N-lauroyl-glyoxalidinium chloride, 2-stearyl-3-methyl - 3 - propylamine-N-oleyl-glyoxalidinium methophosphate, etc.

Representative of the sixth formula are: N-$C_{16}$–$C_{18}$-alkanoyl - N' - methyl-N'-ethanol-N'-lauroyloxyethylethyl-ammonium methosulfate, etc.

The proportions by weight between the surface-active ammonium compound and the optical brightener may vary within wide limits. In agents which have to have a particularly good brightening power, the proportion by weight of optical brightener to surface-active ammonium compound amounts to 5:95 to 25:75. In such agents, in which a good softening action is of supreme importance, the proportion may be from 5:95 to 0.5 to 0.5:99.5. Preferably, agents are used in which the said proportion lies between 10:90 and 1:99.

The mixtures of surface-active ammonium compounds and optical brighteners may be in anhydrous form or may be admixed in the presence of water or with solvents miscible with water. In the first case, mixtures of solid to grease-like consistency are obtained, which may be consolidated by addition of inert fillers or may be converted into granular pourable powders. Preferably, however, the mixtures are present in the form of water-containing pourable dispersions or pastes. Such dispersions generally contain 3% to 15%, preferably 5% to 10% by weight of surface-active ammonium compounds.

The stability on storage of the aqueous dispersions may be improved if desired by addition of small amounts of stabilizers. Suitable stabilizers are, for example, higher fatty acid alkylolamides, especially higher fatty acid mono- or di-ethanolamides, higher fatty acid mono-or di-propanolamides and higher fatty acid mono- or di-isopropanolamides, polyethylene glycols of molecular weights from 200 to 10,000, and also polyethylene glycol ether derivatives of higher molecular weight alcohols, amines, fatty acids and alkylphenols or of alkyl partial ethers or fatty acid partial esters of polyhydric alcohols. In the said polyglycol ether derivatives, the hydrophobic hydrocarbon residue may have 10 to 24 carbon atoms and the polyglycol ether residue may have 2 to 50 ethylene glycol ether groups. The dispersions may contain 0.05% to 5%, preferably 0.1% to 1%, of stabilizers.

Further, the usual additives an solvents may be added to the aqueous dispersions. Neutral salts are suitable, such as sodium chloride, sodium sulphate, sodium borate, sodium acetate, sodium citrate and the corresponding potassium and ammonium salts. Organic solvents, such as low molecular weight alcohols, especially ethanol and isopropanol, ether alcohols, glycols, di-and tri-glycol, glycerine, polyglycerine and glycerine ethers, ketones, urea and alkylureas may also be used. In addition, suitable preservatives, dyestuffs and perfumes may be added to the agents. The incorporation of these substances in the aqueous dispersions is effected in the usual way and causes no technical difficulties.

For use, the agents are diluted with water. 0.05 to 1 g. of the surface-active ammonium compound to 1 liter of water and a bath ratio of 1:4 to 1:30 are generally used. The treatment of the wash is suitably effected subsequent to the washing process during the rinsing with clear water, preferably in the last rinsing bath.

The agents are suitable for all kinds of textiles made from vegetable and animal and synthetic fibers, but especially for those from regenerated, chemically modified and finished cellulose, such as artificial slik, viscose, cross-linked cotton or cotton finished with synthetic resins, and also mixed fabric made of various types of fibers. The treated wash is marked by a soft and pleasant handle as well as by a high degree of whiteness.

The following examples are illustrative of the practice of the invention without being limitative in any respect.

EXAMPLES

Examples 1 to 4

In the following examples a surface-active quaternary ammonium salt was used of the formula

in which the residues $R_1$ and $R_2$ represent straight-chain, saturated alkyl residues with 16 to 18 carbon atoms. Also four different optical brighteners were used of the following structural formula:

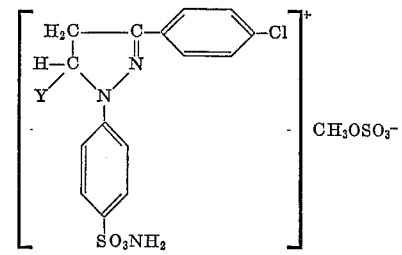

in which Y has the following meanings:

1. —CO—N(CH$_3$)—(CH$_2$)$_2$—N(CH$_3$)$_3$

2. —CO—NH—(CH$_2$)$_3$—N(CH$_3$)$_3$

3. —CO—NH—(CH$_2$)$_2$—N(CH$_3$)—(CH$_2$)$_2$—N(CH$_3$)$_3$

4. —CO—O(CH$_2$)$_2$—N(CH$_3$)(CH$_2$CH$_2$OH)$_2$

Using the above-mentioned components, four dispersions as Examples 1 to 4 of the following composition were prepared:

|  | Percent |
|---|---|
| Quaternary ammonium salt | 8.0 |
| Optical brightener | 0.2 |
| Isopropanol | 2.7 |
| Polyethylene glycol (molecular weight 400) | 0.5 |
| Sodium acetate | 0.3 |
| Perfume | 0.1 |
| Remainder, distilled water. | |

The dispersions were diluted in tap water of 16° German hardness to an ammonium salt content of 0.3 g. per liter. Different textiles were treated with these solutions with a bath ratio of 1:6. After drying, the textiles had a soft pleasant handle and were marked by a high degree of whiteness.

Examples 5 to 8

The experimental results obtained during the treatment of fabrics made from cross-linked cotton or from a mixed fabric are grouped in the following table. The fabrics were washed with a brightener-free washing agent, rinsed and in the last rinsing bath were rinsed with a solution which contained 2 g. of the above-mentioned dispersion in one liter of water. After carrying out the washing and rinsing treatment ten times, the whiteness value was determined photometrically and calculated according to a formula indicated by Berger (see "Die Farbe," No. 8 (1959), pages 187 to 201). The compound given in Example 2 was used as the optical brightener.

Samples for comparison were treated in the same way with an after-rinsing agent which contained, with otherwise unaltered composition, the compound bis-[2-morpholino - 4 - phenylamino-1,3,5-triazyl-(6)]-4,4'-diaminostilbenesulfonic acid, in the form of its sodium salt, instead of the brightener according to the invention. In the table, A represents the whiteness value before the start of the experiments, B represents the whiteness value after ten treatments and V represents the value for the comparative sample, also after ten treatments. The textiles treated with the agent according to the invention showed a distinctly increased whiteness value.

| Example No. | Textile material | Whiteness value | | |
|---|---|---|---|---|
| | | A | B | V |
| 6 | Wet cross-linked cotton | 87.5 | 105.3 | 103.2 |
| 7 | Dry cross-linked cotton | 84.6 | 112.6 | 102.1 |
| 8 | Alkaline cross-linked cotton | 88.8 | 113.9 | 102.4 |
| 9 | Mixed fabric from cotton and polypropylene fibers. | 75.9 | 86.7 | 81.9 |

These values show that for all of the fabrics tested, the combination of softener and optical brightener of the invention caused an increased whiteness with reference to the starting whiteness value and with reference to the use of a known optical brightener in the same combination.

The perceding specific embodiments are illustrative of the practice of the invention. It is to be understood, however, that other expedients known to those skilled in the art may be employed without departing from the spirit of the invention.

We claim:
1. Textile softening and optical brightening composition consisting essentially of a water-dispersible salt of a surface-active ammonium compound having the formula

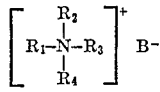

wherein $R_1$ and $R_2$ are aliphatic alkyl having 16 to 18 carbon atoms, $R_3$ and $R_4$ are selected from the group consisting of methyl and ethyl and $B^-$ represents the ion of an acid selected from the group consisting of hydrohalic acids, acetic acid, lower alkyl acid sulfate, lower alkyl acid phosphate, oxalic acid and citric acid and a water-dispersible cationic optical brightener having the formula

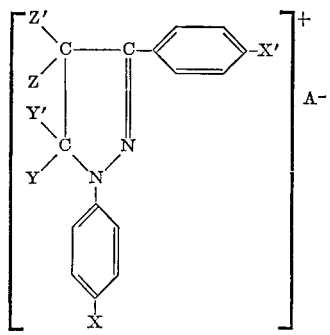

wherein
X is a member selected from the group consisting of $-SO_2NH_2$, $-SO_2R$, $-SO_2OR$, $-COOR$, $-CONH_2$, $-CN$, $-CF_3$, halogen, $-OR$, and R;
X' is a member selected from the group consisting of halogen, $-OR$ and $-R$;
Y is a member selected from the group consisting of

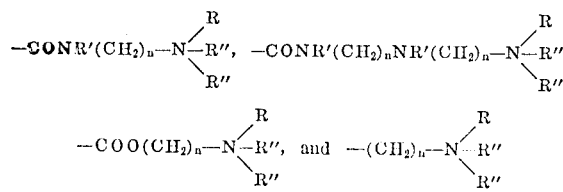

Y' is a member selected from the group consisting of H, $-R$ and phenyl;
Z is a member selected from the group consisting of H and Y;
Z' is a member selected from the group consisting of H and R;
R is alkyl having 1 to 4 carbon atoms;
R' is a member selected from the group consisting of H and R;
R'' is a member selected from the group consisting of R and $-(CH_2)_{n-1}-CH_2OH$;
n is an integer from 2 to 4; and
$A^-$ is an anion of an acid selected from the group consisting of hydrohalic acids, acetic acid, sulfuric acid, phosphoric acid, oxalic acid, citric acid and the acid alkylsulfuric acids wherein said alkyl has 1 to 4 carbon atoms, the proportion by weight of said cationic optical brightener to said surface-active ammonium compound being between 0.5 to 99.5 and 25 to 75.

2. The textile softening and optical brightening composition of claim 1 wherein the proportion by weight of said cationic optical brightener to said surface-active ammonium compound is between 1 to 99 and 10 to 90.

3. The textile softening and optical brightening composition of claim 1 wherein said cationic optical brightener has the formula

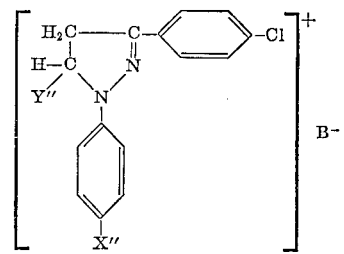

wherein
X'' is a member selected from the group consisting of $-SO_2NH_2$, $-COOR'''$ and $-CONH_2$;
Y'' is a member selected from the group consisting of

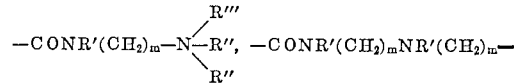

R''' is alkyl having 1 to 3 carbon atoms;
R' is a member selected from the group consisting of R and R''';
R'' is a member selected from the group consisting of R''' and $-(CH_2)_{m-1}-CH_2OH$;
m is an integer from 2 to 3: and
$B^-$ is an anion of an acid selected from the group consisting of a hydrogen halide, acetic acid, sulfuric acid, phosphoric acid, oxalic acid, citric acid and the acid alkylsulfuric acid wherein said alkyl has 1 to 4 carbon atoms.

4. The textile softening and optical brightening composition of claim 3 wherein X'' is $-SONH_2$.

5. The textile softening and optical brightening composition of claim 4 wherein Y' is

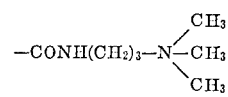

and B is the methosulfate ion.

6. An aqueous dispersion of the textile softening and optical brightening composition of claim 1 wherein said surface-active ammonium compound is present in an amount of from 3% to 15% by weight.

7. The aqueous dispersion of claim 6 wherein said surface-active ammonium compound is present in an amount of from 5% to 10% by weight.

8. The aqueous dispersion of claim 6 having a further content of from 0.05% to 5% by weight of a stabilizer selected from the group consisting of higher fatty acid ethanolamides and propanolamides, polyethylene glycols having molecular weights of from 200 to 10,000, polyethylene glycol ether derivatives of higher molecular weight alcohols, amines, fatty acids and alkylphenols containing a hydrophobic hydrocarbon residue having 10 to 24 carbon atoms and from 2 to 50 ethylene glycol ether groups.

References Cited
UNITED STATES PATENTS

| | | | |
|---|---|---|---|
| 2,640,056 | 5/1953 | Kendall et al. | 117—33.5 TX |
| 3,329,609 | 7/1967 | Blomfield | 252—8.8 |
| 3,451,927 | 6/1969 | Tune | 117—139.5F X |

HERBERT B. GUYNN, Primary Examiner

H. A. PITLICK, Assistant Examiner

U.S. Cl. X.R.

117—33.5T; 252—8.8, 301.2; 260—239.9, 310.0, 311